United States Patent [19]

Wild

[11] Patent Number: 4,565,452

[45] Date of Patent: Jan. 21, 1986

[54] COOLING APPARATUS

[75] Inventor: Rudolf Wild, Heidelberg-Eppelheim, Fed. Rep. of Germany

[73] Assignee: Indag Gesselschaft, fur Industriebedard mbH, Heidelberg-Eppelheim, Fed. Rep. of Germany

[21] Appl. No.: 500,579

[22] Filed: Jun. 1, 1983

[51] Int. Cl.⁴ .............................................. B01F 15/06
[52] U.S. Cl. ..................................... 366/149; 99/455; 99/517; 165/90; 165/109.1; 366/228; 366/233
[58] Field of Search ........................ 366/144, 147–149, 366/220, 225, 227–229, 233; 165/90, 109 R, 89, 91, 109 T; 62/63; 99/516, 455, 517

[56] References Cited

U.S. PATENT DOCUMENTS

| | | | |
|---|---|---|---|
| 943,294 | 12/1909 | Baker | 366/144 X |
| 1,062,888 | 5/1913 | Clark | 366/144 X |
| 1,956,621 | 5/1934 | Parker | 165/90 X |

Primary Examiner—Timothy F. Simone
Attorney, Agent, or Firm—Blum, Kaplan, Friedman, Silberman & Beran

[57] ABSTRACT

A cooling method is provided for hot material and in particular for fruit preparations, where the containers receiving the hot material to be filled in are on their outside contacting a cooling medium and are constantly rotated around at least one axis, such that a continuous circulation and mixing of the material to be filled in is provided. The containers are like barrels and are provided with a cylindrical container jacket. Sheet metal mixing baffles extend inwardly from the walls, which provide for a continuous circulation of the filled in material upon rotation of the containers around their axes. The cooling provision is an immersion bath filled with liquid and which bath is provided with a rotary drive for rotating the containers around their longitudinal axes.

32 Claims, 9 Drawing Figures

COOLING APPARATUS

DESCRIPTION

BACKGROUND OF THE INVENTION

1. Field of the Invention

The present invention relates to a method for cooling of matter such as for example, fruit preparations filled in a hot state into containers, where the filled containers are subjected to an external cooling medium, as well as to a container suitable for such a cooling process and to a cooling provision for this purpose.

2. Brief Description of the Background of the Invention Including Prior Art

All food preparations and intermediate products produced under sterile conditions or, respectively, sterilized at the end of the production process should be filled in in a hot state and then should be cooled under mild conditions. In particular, a mild cooling is required in the case of so-called fruit preparations.

Mixtures prepared from fruits or from pieces of fruits, sugar and water or, respectively, sugar solutions and possibly additional components are designated as "fruit preparations", which, for example, are employed in the production of fruit yoghurt, but also as starting materials for nectars. Regular sugar can be substituted for in such preparations by other sweetening agents such as for example fructose syrup. If such fruit preparations are to be employed in the production of fruit yoghurt or similar food products, then it is desirable that the consistency and shape of the fruits employed, such as for example, stoned cherry or apricot pieces, are in the final food product in their original condition.

During the filling of small containers, such as for example, cans with a capacity of a liter, the cooling of the filled in matter does not provide substantial difficulties. However, the heat removal from the material filled in is a considerable problem in the case of large containers. Neither a method meeting the practical requirements nor a suitable apparatus have been developed so far for this purpose.

SUMMARY OF THE INVENTION

1. Purposes of the Invention

It is an object of the present invention to provide a practical method for cooling of matter filled hot into containers and provisions for the realization of such a method.

It is a further object of the present invention to provide a container adapted to use in a process for cooling viscous liquids under mild conditions.

It is another object of the invention to provide a cooling process for containers adapted to continuous production.

These and other objects and advantages of the invention will become evident from the description which follows.

2. Brief Description of the Invention

The present invention discloses a cooling provision for hot filled matter which comprises a container for the matter to be cooled having at least in part a rotation symmetrical outer shape, means external to the container for providing a rotary force to the container to rotate the same at least around one axis, means disposed inside the container for providing continuous mixing and circulating of the matter inside the container based on the rotation of the container, and cooling means surrounding the container. The matter to be cooled in the container is preferably a fruit product.

The container can be provided with a substantially cylindrical jacket and the means disposed inside the container can comprise sheet metal mixing baffles. The sheet metal mixing baffles are sloped upwardly in the longitudinal direction of the cylinder like a helical winding versus a cross plane intersecting the container jacket. The sheet metal mixing baffles are mixing wings extending over certain predetermined circumferential regions. The sheet metal mixing baffles can be staggered with respect to each other in circumferential and axial direction. The floors terminating the cylinder jacket of the container at its front faces can be provided with sheet metal mixing baffles extending spirally with respect to the cylinder axis. The sheet metal mixing baffles preferably extend at a distance from the container walls under formation of a slot for flow through.

The container jacket can be provided with beads extending radially outwardly and running around at equal distances from each other. The beads impressed into the container jacket can be radially outwardly directed annular rings, which surround the cross planes intersecting the container jacket. Preferably, the beads extend around the container jacket like a helical winding.

The cooling means can comprise a filled immersion bath and the means external to the container for providing rotary force can be a rotary drive for rotating the immersed containers around their longitudinal axes. The rotary drive can comprise two sets of in each case two support rollers disposed in cross direction also at a distance from each other for the immersed container and disposed at the floor of the immersion bath in direction of the longitudinal axis of the container immersed in horizontal position, which rollers are rotatably supported around axes running parallel to the longitudinal axis of the container and of which at least one is rotary driven. The bath can be provided as a long extended cooling channel with a drive provision for transporting the immersed container in the longitudinal direction of the channel in the direction of the arrow shown in the drawing.

The drive provision for transporting the immersed container in the longitudinal direction of the channel can comprise sets of in each case two support rollers, which are at most of half the length of the container disposed at predetermined distances in the direction of the longitudinal extension of the channel and at least in each case one support roller is provided with a rotary drive. The support rollers can be provided as rolls and surrounding rail grooves of the rolls can be adapted to the beads directed according to their shape outwardly of the containers. The rail grooves can extend like a helical winding with a slope versus the roller longitudinal axis around the roller jacket of the support rollers.

The drive provision for the container can comprise helically disposed beads around the container and circular grooves around the roller, helically disposed beads around the container and helically disposed grooves around the roller, circular disposed beads around the container and helically disposed grooves around the roller, helically disposed grooves around the container and circular disposed beads around the roller, helically disposed grooves around the container and helically disposed beads around the roller, and circular disposed grooves around the container and helically disposed beads around the roller. The beads or grooves around the roller can be provided by a thread around the roller.

There is also provided a container for cooling material to be filled in at a hot state which comprises a rotation axis for allowing the container to rotate during the cooling step, a cylindrical jacket of the container to provide contact to a cooling medium during the cooling step, helically disposed beads surrounding the container jacket for allowing to transfer rotary and linear motion to the container by way of an external drive, and sheet metal mixing baffles attached to the inside walls of the container.

There is further provided a method for cooling of matter filled into a container in a hot state which comprises disposing the container filled with the hot matter into a cooling medium, continuously rotating the container by way of an external drive means at least around one axis during contact with the cooling medium, and circulating and mixing the matter inside the container based on the rotary motion of the container. Preferably, the container is submerged into the cooling medium. The container further can be transported in the direction of its axis by way of a helical motion induced by the means providing support to the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
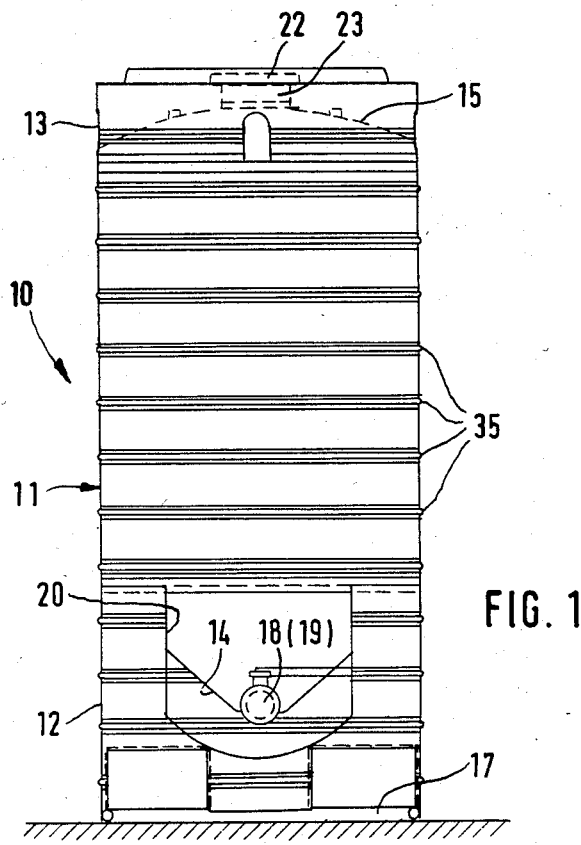
FIG. 1 is a schematic front elevational view of a stand container formed as a barrel for matter to be filled in hot and to be cooled after the filling.

In accordance with the present invention there is provided a process where the container filled with the material is continuously rotated around at least one axis during the interaction with the cooling medium and where based on said rotation the material filled into the container is constantly circulated and mixed such that by way of the heat removal from the filled in material in the regions close to the wall the temperature is continuously reduced, and other parts of the material filled in are placed in a contact with the walls of the container resulting in a steady effective heat outflow to the cooling medium acting on the container walls from the outside.

Thus there is provided a method for cooling of materials filled while hot into containers such as fruit preparations, where the filled containers are subjected to an externally provided cooling medium interaction, where the container receiving the filling material is continuously rotated around at least one axis during the interaction with the cooling medium and where based on this rotation the filling is steadily circulated and mixed in the containers. The container 10 can be a barrel with a substantially cylindrical container jacket 11, which is provided at its inside walls with sheet metal mixing baffles 40 extending toward the inside. The sheet metal mixing baffles 40 can slope upwardly versus a cross plane intersecting the container jacket like a helical thread in the direction of the longitudinal axis of the cylinder. The sheet metal mixing baffles 40 can be provided as mixing wings extending over predetermined circumferential regions. The sheet metal mixing baffles 40 are disposed staggered with respect to each other in circumferential and axial direction.

The floors 14, 15 concluding the cylinder jacket of the container 10 at the front faces are provided with sheet metal mixing baffles 40 extending spirally with respect to the cylinder axis. The sheet metal mixing baffles 40 extend at a distance from the container walls under formation of flow through slots 42. The container jacket 11 is provided with beads 35 extending radially outwardly and running at equal distances from each other. The beads 35 impressed into the container jacket 11 are annular rings radially directed outwardly, which surround in cross planes intersecting the container jacket. The beads 35 can be extending helically around the container jacket 11.

An immersion bath can be provided filled with cooling liquid 56 and a rotary drive 54, 55 can be provided for rotating the immersed containers 10 around their longitudinal axes. The rotary drive can comprise two at the floor 53 of the immersion bath disposed sets, which are positioned at a distance from each other in the direction of the longitudinal axis of the in horizontal position immersed containers 10, of in each case two support rollers 54, 55, also disposed at a distance from each other, for the immersed containers, which rollers are rotatably mounted around axes running parallel to the longitudinal axis of the immersed containers and of which at least one is rotary driven.

A long extended cooling channel 51, 55 can be provided with a drive provision for transporting the immersed containers in the longitudinal direction of the channel according to arrow 61, 64. The drive provision for further transporting of the immersed containers 10 in the longitudinal direction of the channel can comprise sets of in each case two support rollers 54, 55, disposed in the longitudinal direction of the channel at preset distances, which are at most equal to one half of the longitudinal extension of the containers, and at least one in each case of the support rollers is rotary driven.

The support rollers 54, 55 can be provided as rolls, which are provided with track grooves 58 adapted in their shape to the beads 35 directed outwardly of the containers 10. The track grooves 58 extend in the way of a helical thread with a slope versus the roller longitudinal axis around their roll jacket of the support rollers 54, 55.

The invention employs the principle that in addition to the rotation of the container holding the material to be filled in there is required during the interaction with the cooling medium a steady circulation of the material filled in in the container such that continuously other parts of the container filling obtain contact with the container walls or with regions close to the walls. Therefore, the present invention also provides a container for material to be filled in hot and then to be cooled according to the method set forth above such that a container provided as a barrel with a substantially cylindrical container jacket is provided with mixing baffles, which extend from the walls inwardly and which advantageously are upwardly and helically sloped in the direction of the longitudinal axis of the cylinder versus a cross axis intersection with the cylinder. It also has proved advantageous if the sheet metal mixing baffles are provided as mixing wings, which extend over certain circumferential regions and which are disposed staggered with respect to each other successively in circumferential and axial direction. In addition, also the floors forming the front ends of the cylinder jacket of the container can be provided with sheet metal mixing baffles extending spirally with respect to the cylinder axis.

A particularly effective cooling of the container filling is achieved, if according to a particular embodiment the sheet metal mixing baffles extend at a distance from the container walls under formation of flow through slots such that upon rotation of a container around its longitudinal axis the continuously circulated and mixed material filled in can pass through said flow through slots provided between the container walls and the sheet metal mixing baffles disposed at a distance from the container walls.

A further important embodiment of the container is characterized in that the container jacket is provided with radially outwardly extending beads running at equal distances from each other, which are formed as annular rings running in cross planes with respect to the container jacket or which are helically threaded extending around the container jacket.

The cooling provision also provided according to the invention for performing the above illustrated method employing a container of the above illustrated kind is characterized by an immersion bath filled with cooling liquid and further by a rotary drive for rotating the immersed containers around their longitudinal axes. The rotary drive can comprise two sets of in each case in cross direction also at a distance disposed support rollers at the bottom of the immersion bath in the direction of the longitudinal axis of the immersed containers for the immersed containers, which rollers are supported rotatably around axes running parallel to the longitudinal axes of the immersed containers and of which at least one support roll is provided with a rotary drive.

The immersed containers are thus received on the sets of in each case two support rollers disposed at a distance from each other in such an embodiment of the cooling provision and based on the rotary drive at least one support roller is placed in rotation around its longitudinal axes.

In addition, it has proved to be advantageous to furnish the cooling provision as a long extended channel and to provide it with a drive device for transporting the immersed containers in the longitudinal direction of the channel. Thus the simultaneous reception of a larger number of containers is possible, which are successively guided through the cooling channel and are therewith slowly cooled down from the filling temperature, where in view of the rotation of the containers and the thereby caused continuous circulation and mixing of the filling material a substantially uniform cooling of the filling material is assured.

The drive provision for further transporting of the immersed containers in the longitudinal direction of the channel can comprise sets of in each case two support rollers disposed at preset distances, which are at most equal to one half of the length of the containers, in the direction of the longitudinal extension of the channel, and at least one in each case of the support rollers is provided with a rotary driving force. By setting the distance of the support rollers succeeding each other in the longitudinal direction of the channel to at most half the length of the containers it is assured that the containers at the further transporting are always received on two in transporting direction successive support roller pairs.

Another important feature of the invention comprises that the support rollers are formed as rolls and are provided with surrounding track grooves adapted in their shape to the outwardly directed beads of the containers such that the container beads radially extending over the jacket of the container engage the track grooves and thus a sure guiding and taking along of the containers is assured. As far as the containers are provided with helically disposed beads the track grooves can be annular grooves cut into the support rollers. Upon the formation of the container beads as closed annular rings then the track grooves extend in the kind of helical threads around the roll jackets.

Figure 2:
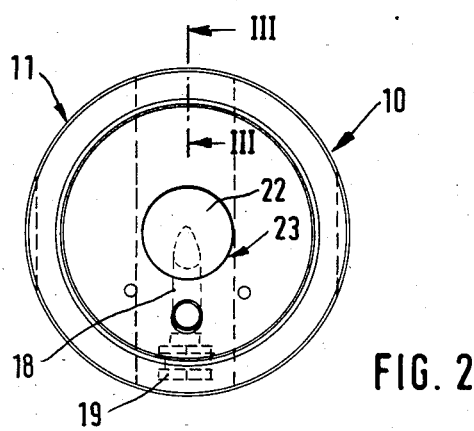
FIG. 2 is a plan view onto the container of FIG. 1.
Figure 3:
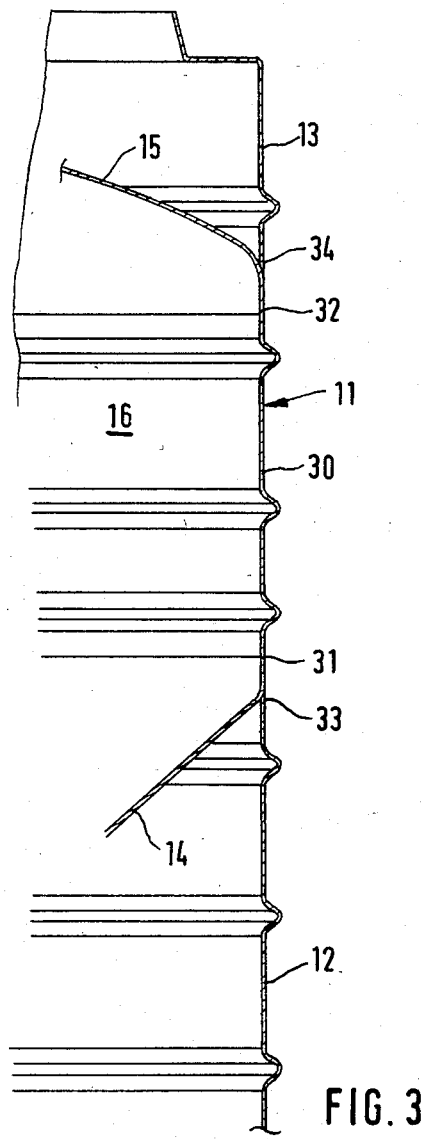
FIG. 3 is a partially sectional view along section line III—III of FIG. 2 of the container jacket provided with beads directed to the outside.

The container 10 illustrated in particular in FIGS. 1 and 2 is a stand container with a cylindrical container jacket 11, which extends with the sections 12, 13 downward and upward beyond the inner space 16 closed by the container floors 14, 15. The section 12 of the container jacket is provided as a stand base and is provided at its lower end with a massive stand support ring 17. A tube connection piece 18 for the withdrawal of the material filled in extends from about the lowest point of the conical shaped lower container floor 14 and is furnished with a connecting fitting 19, which tube connection piece ends in the region of a recess 20 in the lower section 12 of the cylindrical container jacket at a radial distance from the circular periphery of the container jacket. The container floor 15 terminating the proper container at the upper side is just as the lower bottom 14, provided as a shell part and furnished with a filler connection piece 23 closable with a removable cover 22. In addition, three additional filling connection pieces 24, 25, 26 of a comparable small cross section are disposed in the upper container floor, one of which is provided with a pressure relief valve, the other with a valve for example for providing the container with a gas such as carbon dioxide and the third is provided with a cock for addition of, for example, flavoring agents. The upper section 13 protrudes beyond the upper container floor with the said tube connection piece such that these tube connection pieces and possibly coordinated fittings similar to the withdrawal provision 18, 19 extending from the lowest place of the lower container floor are surrounded by sections 12, 13 and therefore are protected against damages during transport and during storage of the containers.

The container 10 comprises an essentially cylindrical center part 30 and the floors 14, 15 connected to the center part by circumferentially running round seams 31, 32. The cylindrical sections 12, 13 of the container jacket 11 are solidly connected to the cylindrical center part of the container or, respectively, to cylindrical connection pieces of the container floors 14, 15 welded to the middle part by way of again surrounding round welding seams 33, 34. The container center part 30 and the sections 12, 13 are provided with radially outwardly directed, surrounding beads 35, which are disposed under the same axial distances from each other and which form surrounding ring beads, the importance of which, beyond the stiffening of the container jacket, is illustrated further down in connection with the cooling provision. The beads on the outside of the container are preferably spaced at a distance amounting to from about 0.1 to 0.3 of the diameter of the container.

Figure 4:
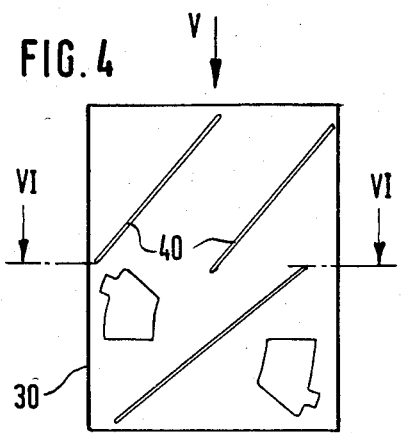
FIG. 4 is a schematic longitudinal sectional view through the cylindrical center part of a container provided with the sheet metal mixing baffles on the inside of the container walls.
Figure 5:
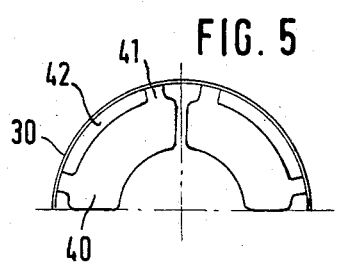
FIG. 5 is a plan view onto a half of the container according to arrow V of FIG. 4 with the sheet metal mixing baffles disposed at the container walls under formation of slots for flow through of material.
Figure 6:
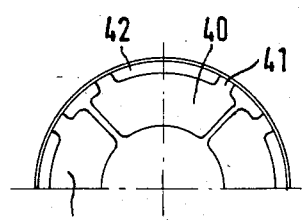
FIG. 6 is a plan sectional view onto the sheet metal mixing baffles according to section line VI—VI of FIG. 4 showing half of a cross-section.

Sheet metal mixing baffles 40, 40' are disposed in the interior of the container to hold the filled in material as shown in FIGS. 4 to 6 at an angle with regard to the vertically running longitudinal axis 36 of the container, which baffles extend radially inwardly from the container wall. As shown in particular in FIG. 4, the sheet metal mixing baffles are staggered with respect to each other and are only in the region of their ends connected to the container wall by way of attachment webs 41. The number of sheet metal mixing baffles staggered around the circumference of the inner barrel wall is preferably from about 3 to 8. Otherwise, flow-through passage slots 42 are disposed between these sheet metal mixing baffles and the inner wall of the container, which slots have such a radial extension that upon mixing of the filled in material the latter can pass through the said flow-through passage slots 42 such that a streaming and flowing of the filled in material close to the wall is assured during the mixing and circulating described in more detail further below. The width of the flow passage slots is preferably from about one tenth to one third of the radial width of the respective sheet metal mixing baffles.

Figure 8:
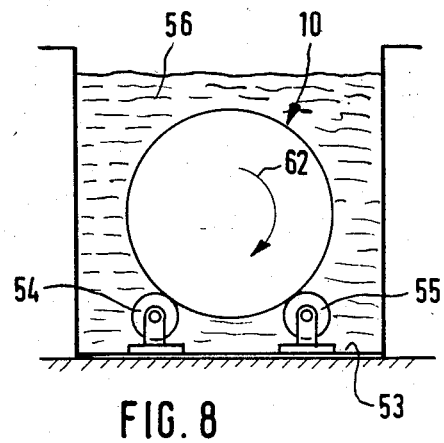
FIG. 8 is a cross-sectional view along section line VIII—VIII of FIG. 7 through a cooling channel.
Figure 9:
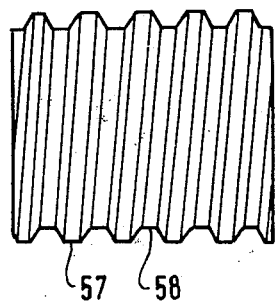
FIG. 9 is a side elevational view of one of the support rollers by itself showing the helical thread-like grooves on the roller jacket.

The cooling provision 50 is provided as an immersion bath , which comprises two long extended cooling channels 51, 52 running parallel to each other. Sets of in each case two support rollers 54, 55 are disposed at the floor of these cooling channels in the longitudinal direction of the channel at distances from each other, which amount to at most half the length of the containers 10, which in turn are disposed in cross direction to the longitudinal extension of the cooling channel at such distances from each other that the containers disposed in a horizontal position in the cooling channnels and immersed into the cooling liquid 56 contained in the cooling channels are received by the support rollers in the way shown in FIG. 8. At least one support roller of each roller set is provided in each case with a rotary drive not shown and the roll-shaped formed support rollers are provided with the helical thread like disposed cut in track grooves 58, the cross-sections of which correspond to the beads 35 in the container jacket 11. In view of the helical thread-like formation of these track grooves 58, the support rollers 54, 55 provide upon rotation around their rotation axes running in the longitudinal direction of the cooling channel according to arrow 59 a linear drive to the container 10, which is kept in a horizontal position by these support rollers. Preferably, the diameter of the support rollers is from about 0.1 to 0.3 of the diameter of the container. The distance passed by the linear motion of the container relative to the path of its circumferential wall during the rotation while moving in the cooling liquid can be from about 0.02 to 0.2.

Figure 7:
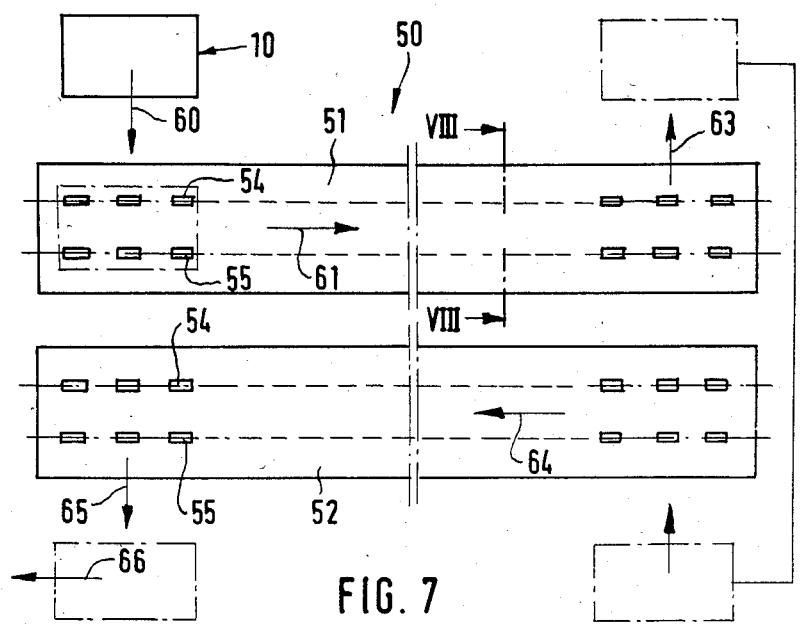
FIG. 7 is a schematic plan view onto the cooling provision comprising two long extended and parallel running cooling channels.

After the filling and closing of the container 10, which is not of interest in its details at this point, the containers are tilted at the beginning of one of the cooling channels by way of a provision not shown here further into the horizontal position shown indicated in FIG. 7 and are then lowered to the support rollers disposed at the floor of the cooling channel 51 as indicated in FIG. 7 and they are thereby immersed into the cooling liquid 56. Preferably, the containers are completely immersed into the cooling liquid disposed in the cooling channel. The width of the cooling channel is preferably from about 1.2 to 2 times the diameter of the containers 10 to be cooled. After the immersion the containers, the beads of which engage the track grooves 58 of the support rollers 54, 55, are transported based on the rotation of the support rollers according to arrow 61 away from the immersion location toward the remote end of the cooling channel. It can be recognized that depending on the length of the cooling channel in each case simultaneously a larger number of containers can be received and be transported in the longitudinal direction of the channel.

During the longitudinal transporting of the containers 10 through the cooling channel 51 these receive continuously a rotation around their container longitudinal axes according to rotary arrow 62. The material to be mixed is continuously circulated and mixed by way of the sheet metal mixing baffles 40 protruding radially into the interior 16 of the container under formation of flow through passages 42 with respect to the container walls, such that continuously other parts of the filled in material come into contact with the container walls. Preferably, the mixing baffles protrude into the interior of the container by a radial amount of from about 0.1 to 0.3 of the diameter of the container. Based on the heat outflow through the container walls into the cooling medium 56 there is provided an effective cooling of the material filled in and in particular the formation of a hot core of the filled in material is prevented. Therefore, the filled in material is cooled at the end of the first cooling channel 51 to a substantially uniform temperature noticeably reduced as compared to the fill-in temperature. At the end of this first cooling section the containers are then lifted out of the cooling bath according to arrow 63 and are transferred into a second cooling channel 52 such that they are there in the same way according to arrow 64 transported to the end of the second cooling channel neighboring the immersion station of the first cooling channel according to arrow 64 and are then lifted out of the cooling bath and are transported to storage or for delivery as indicated by way of arrows 65, 66.

The partitioning of the total cooling section into two parallel running cooling channels 51, 55 and the thereby required transfer of the containers 10 at the end of the first cooling channel into the second cooling channel is of particular import since in case of such filled in materials, as are to be provided with flavoring agents after cooling down to a certain preset temperature level. After the bringing in of the flavoring agents and after the lifting of the containers 10 from the first cooling channel 51 in a way not of interest in this context and after the containers are inserted into the second cooling channel 52, an intensive mixing of the added flavoring agents and of the filled in material is provided during the longitudinal motion of the container through the second cooling channel by way of the container rotation according to arrow 62. The length of each of the parallel cooling channels preferably is from about 10 to 50 times the length of an individual container depending on the throughput desired.

Of course, one cooling channel of a suitable longitudinal extension can be employed instead of the two cooling channels running parallel to each other and, for example, at half length of the single cooling channel a station could be provided where the containers are lifted out of the cooling channel, are provided with flavoring agents and are then again immersed into the cooling bath.

It will be understood that each of the elements described above, or two or more together, may also find a useful application in other types of cooling systems or food processing procedures differing from the types described above.

While the invention has been illustrated and described in the context of a system for cooling fruit preparations in containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for cooling substances, comprising:
   container means for holding the substances, the container means having a central axis and mixing means coupled to an interior surface of the container means for mixing the substances in the container means when the container means is rotated about the central axis;
   tank means for receiving the container means and allowing motion of the container means parallel to the central axis of the container means;
   movement means coupled to the tank means for rotating the container means about the central axis and moving the container means parallel to the central axis; and
   cooling means in the tank means for at least partially surrounding the container means and cooling the substances within the container means;
   whereby the rotation of the container means about the central axis causes mixing of the substances within the container means which are thereby substantially evenly cooled.

2. The apparatus of claim 1 wherein the container means is a substantially cylindrical container.

3. The apparatus of claim 1 wherein the container means comprises a first container for holding the substances to be cooled and a second container enclosing the first container.

4. The apparatus of claim 3 wherein the first container has first and second outlets for allowing the insertion and removal of the substances into and from the first container.

5. The apparatus of claim 1 wherein the movement means comprises pairs of rollers coupled to the tank means adapted to rotate the container means about the central axis and to move parallel to the central axis of the container means.

6. The apparatus of claim 5 wherein the roller means interacts with the outer surface of the container means to cause rotation and linear movement in the tank means in a direction parallel to the central axis and through a range of motion defined as a channel.

7. The apparatus of claim 5 wherein the roller means comprises pairs of rollers, at least one of each pair being driven to rotate about an axis parallel to the central axis.

8. The apparatus of claim 6 wherein the roller means comprises pairs of rollers, at least one of each pair being driven to rotate about an axis parallel to the central axis.

9. The apparatus of claim 8 wherein the pairs of rollers are spaced apart along the channel.

10. The apparatus of claim 9 wherein the container means has a length in the direction parallel to the central axis and the pairs of rollers are spaced apart no more than half the length of the container means.

11. The apparatus of claim 7 wherein the rollers have grooves about their axes parallel to the central axis and the container means has bead means on its exterior surface adapted to cooperate with the grooves on the rollers to cause rotation of the container means about the central axis and movement through the channel from a first end to a second end.

12. The apparatus of claim 11 wherein the rollers have helical grooves and the outer surface of the container means has beads which are one of annular and helical with respect to the central axis.

13. The apparatus of claim 11 wherein the rollers have annular grooves spaced apart parallel to the rollers axis of rotation and the outer surface of the container means has helically shaped beads.

14. The apparatus of claim 6 wherein the rollers have circular beads spaced apart substantially perpendicular to the axis of rotation of the rollers and the container means has grooves extending helically about the outer surface of the container means and adapted to interact with the beads on the roller means to provide rotation of the container means about the central axis and movement from a first end to a second end of the channel.

15. The apparatus of claim 6 wherein the rollers have beads extending helically about the periphery of the rollers and the container means has grooves extending about the outer surface of the container means in one of helical grooves and spaced apart annular grooves substantially perpendicular to the central axis, the grooves on the container means being adapted to interact with the beads on the rollers to rotate the container means about the central axis and move the container means in the channel in a direction from a first end to a second end when the rollers are driven.

16. The apparatus of claim 10 wherein the length of the channel is from about ten times the length of the container means to fifty times the length of the container means.

17. The apparatus of claim 6 further comprising second channel means having roller means for rotating and moving the container means parallel to the central axis of the container means.

18. The apparatus of claim 16 further comprising second channel means having roller means for rotating and moving the container means parallel to the central axis of the container.

19. The apparatus of claim 18 wherein the second channel is substantially the same length as the channel and the container means is moved in the second channel in a direction opposite to the direction the container means is moved in the channel.

20. The apparatus of claim 17 wherein the container means is moved in the second channel in a direction opposite to the direction it is moved in the channel.

21. The apparatus of claim 20 wherein the apparatus further comprises means for moving the container means from the channel to the second channel.

22. The apparatus of claim 2 wherein the mixing means includes a plurality of mixing baffles.

23. The apparatus of claim 1 wherein the mixing means includes a plurality of mixing baffles which are coupled to an interior surface of the container means.

24. The apparatus of claim 1 wherein the mixing means includes a plurality of mixing wings coupled to the interior surface of the container means so as to provide a space between the interior surface of the container means and the wing means.

25. The apparatus of claim 23 wherein each of the mixing baffles is angled relative to the central axis of the container means.

26. The apparatus of claim 25 wherein the interior surface of the container means has a substantially circular cross section.

27. The apparatus of claim 19 wherein each of the mixing baffles is a wing which is a portion of an annulus with two connecting portions, the connecting portions coupling the mixing baffle to the interior of the container means while providing a space between the mixing wings and the interior of the container means.

28. The apparatus of claim 27 wherein the space is adapted to allow movement of the substances within the container means between the interior surface and the mixing baffle.

29. The apparatus of claim 27 wherein the portion of the annulus is approximately one-quarter of an annulus.

30. The apparatus of claim 1 wherein the cooling means surrounds the entire container means.

31. The apparatus of claim 1 wherein the cooling means is a liquid.

32. The apparatus of claim 1 wherein the substance to be cooled is a viscous fruit mixture.

* * * * *